Sept. 13, 1938. E. D. TILLYER 2,129,889
LENS TESTING INSTRUMENT
Filed May 8, 1936 3 Sheets-Sheet 1
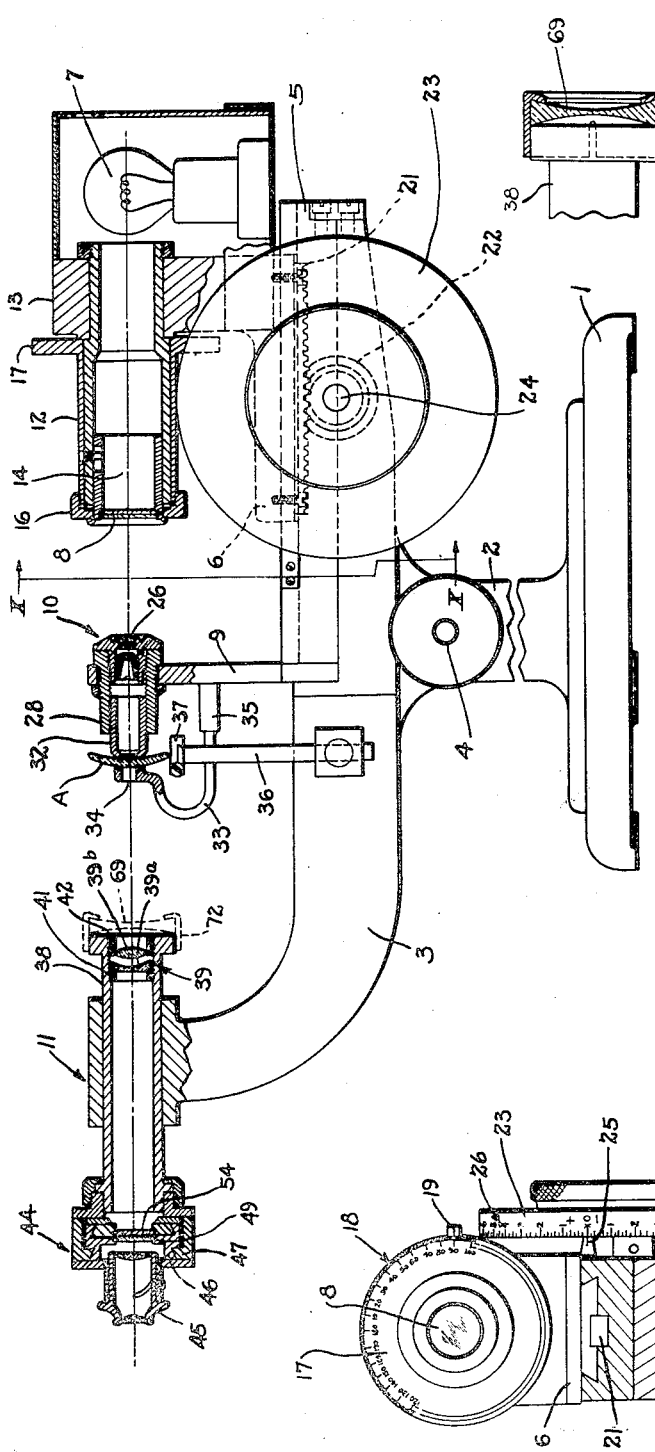
INVENTOR
Edgar D. Tillyer
BY
Harry H. Styll
ATTORNEY

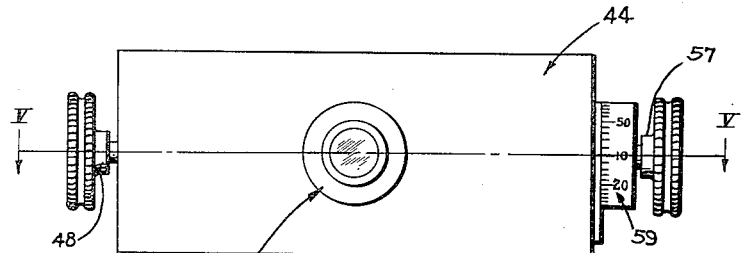
FIG. III
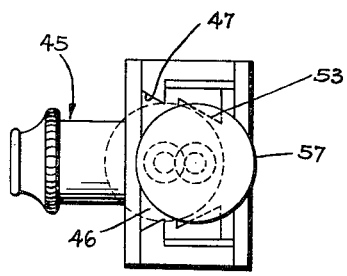
FIG. IV
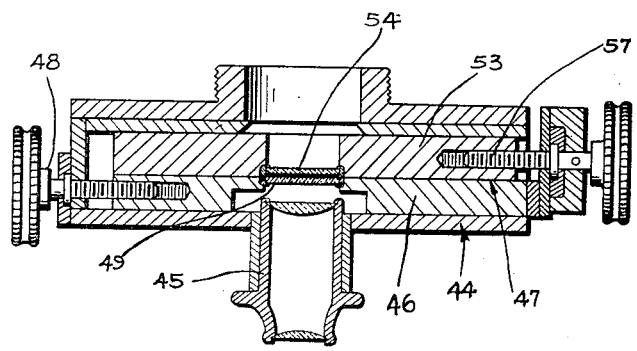
FIG. V
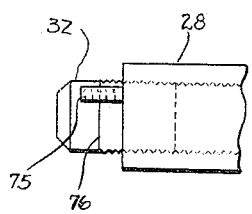
FIG. XIII
INVENTOR
Edgar D. Tillyer
BY
Harry H. Styll
ATTORNEY Sept. 13, 1938.  E. D. TILLYER  2,129,889
LENS TESTING INSTRUMENT
Filed May 8, 1936  3 Sheets-Sheet 3
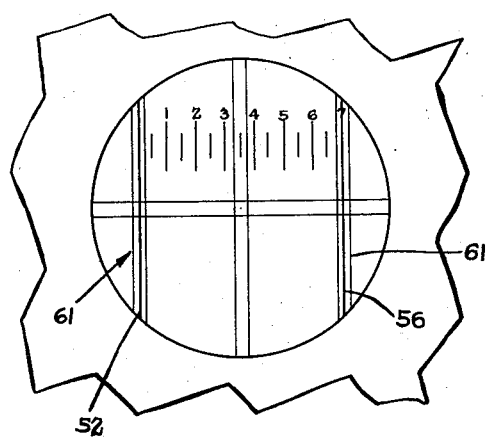
FIG. VI
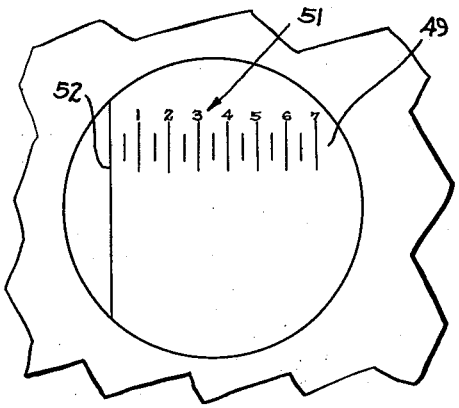
FIG. VII
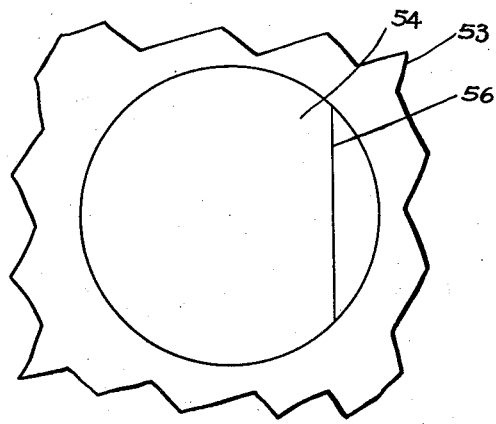
FIG. VIII
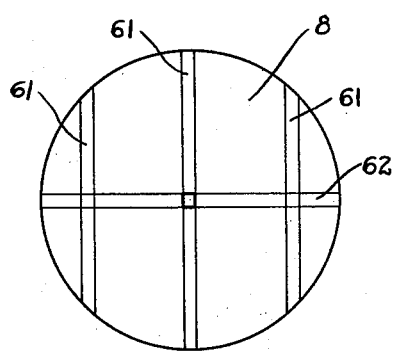
FIG. IX
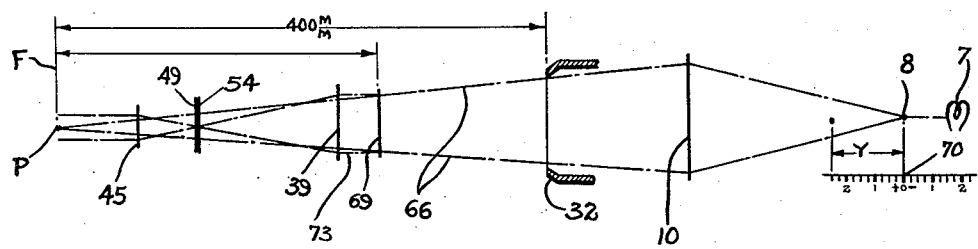
FIG. XI
INVENTOR
Edgar D Tillyer
BY
Harry H. Styll
ATTORNEY Patented Sept. 13, 1938

2,129,889

UNITED STATES PATENT OFFICE 2,129,889

LENS TESTING INSTRUMENT

Edgar D. Tillyer, Southbridge, Mass., assignor to American Optical Company, Southbridge, Mass., a voluntary association of Massachusetts Application May 8, 1936, Serial No. 78,601

11 Claims. (Cl. 88—56)

This invention relates to the method or process of measuring the magnification of lenses and/or lens systems and to improved apparatus therefor.

The magnification of an optical system can be substantially divided into two parts, one part the magnification as produced by an infinitely thin lens of the focal power or back focus of the combination placed at a given position relative to the eye referred to herein as power magnification and the other part of the magnification as produced by the shape of the combination substantially independent of the power. This term shape magnification includes the magnification produced by the surfaces, separations, thicknesses, and indices of refraction but not that due to the focal power of the combination and is therefore referred to herein as shape magnification.

Heretofore, the shape magnification of lenses separate of the effect of power has not been measured. Accordingly, it is one of the major objects of this invention to provide a process and apparatus for performing this function.

Another major object of the invention is to provide means which may be quickly and easily applied to commercial instruments for checking and measuring the power factors of lenses or lens systems whereby the shape magnification of said lenses or lens systems may be determined independently of the said power factors.

Another object is to provide improved means and method of determining the shape magnification of a lens or lens system as in actual use as when looking at a distant object and also as when looking at a near object or object at reading distance from the eye.

Another object of the invention is to provide means for determining the change in magnification produced by moving a lens to a different distance from the eye.

Another object of this invention is to provide a method and apparatus by which the shape magnification of a lens or lens system may be determined independently of the magnification thereof due to focal power.

A further object is to provide simple apparatus which measures the focal power, cylindrical power, the axis of the cylinder and the shape magnification in the desired meridians, of any lens system and especially lenses in their ophthalmic mountings and in their position with respect to the eyes as when they are worn.

A further object of this invention is to provide an apparatus of the type described in which the several parts are so mechanically related that manufacturing or production defects, inaccuracies or variations in the optical system may be mechanically compensated for, thereby insuring accurate measurements.

A further object of this invention is to provide an apparatus of the type described in which the shape magnification may be determined in any meridian.

A still further object of this invention is the provision of an apparatus of the type described in which the accuracy of the shape magnification reading will be substantially unaffected by substantial out of focus positions.

Other objects and advantages of the invention will become apparent from the following description taken in connection with the accompanying drawings, and it will be apparent that many changes may be made in the details of construction, arrangement of parts, and method shown and described without departing from the spirit of the invention as expressed in the accompanying claims. I, therefore, do not wish to be limited to the exact details and method shown and described as the preferred form only has been shown in the way of illustration.

Referring to the drawings:

Fig. I is a partial cross section of an apparatus embodying the present invention;

Fig. II is a schematic diagram of the optical system of the apparatus shown in Fig. I;

Fig. III is a front view of the attachment embodying the invention;

Fig. IV is an end view of Fig. III;

Fig. V is a plan sectional view taken on line V—V of Fig. III and looking in the direction of the arrows;

Fig. VI is a view looking through the eye piece showing the superimposition of the cross hairs of the shape magnification measuring attachment on the image of the target of the instrument proper;

Figs. VII, VIII and IX are partial detail views showing separately the superimposed elements of Fig. VI for measuring the size of the image formed by the target in the eye piece of the instrument;

Fig. X is a sectional view taken on line X—X of Fig. I and looking in the direction indicated by the arrows;

Fig. XI is a diagrammatic view showing the instrument adjusted for measuring lenses or lens systems as when in use when looking at a near object or object at standard reading distance from the eyes;

Fig. XII is a fragmentary view showing the auxiliary near vision test attachment to the instrument; and Fig. XIII is an enlarged fragmentary view of the lens supporting nose of the instrument showing scale and indicator means for determining the amount of adjustment thereof.

Broadly speaking, the invention comprises a method and apparatus for testing lenses by projecting the image of a test target of finite dimensions upon a viewing apparatus, determining the size of said image and then projecting the image through the lens to be tested and on to the viewing apparatus, again determining the size of said image and then noting the difference of the two sizes, to determine the shape magnification of the lens under test. The apparatus may also have means for and the method may also include the step of focusing the test target so as to produce a very clear cut image of said target and thereby greatly facilitate taking more accurate size readings.

It is believed that a clearer understanding of the invention will be grasped by first discussing the optical principles by which the objects of the invention are accomplished and then proceeding with a description of the mechanical features by which the optical conditions are effected.

It has been found that the size of the image of a target projected by a lens and as viewed in a telescope adjusted to parallel light, is not changed in size when an infinitely thin lens of any power is placed at the principal focal plane of the target projecting lens and on the telescope side of said projecting lens. This is true whether the target is moved for exact focusing or not, although for distinctness of vision focusing of the target is preferable.

According to this invention, means are provided by which the image of a target may be projected where it may be readily viewed by the operator. The target may take any convenient form being shown as comprising preferably a plurality of parallel lines. The lines of the target may be fixed, as shown, and means adjacent the screen provided for determining the size of the image cast or the distance between the lines of the target may be variable to coincide with fixed lines of the size determining means. The change in the ratio between the size of the target and the size of the image with and without the lens under test modifying the rays of the image gives the shape magnification.

The optical system includes a standard lens system, to project the image of the target to a distance with respect to the lens under test, an objective lens system for receiving the projected image of the target, and an eye piece for magnifying the image so that it may be easily examined.

The target is slidable longitudinally of the optical axis and is provided with suitable illumination. Means is provided on the instrument for securely holding the ocular surface of the lens to be tested exactly in known relationship to the principal focal plane of the standard lens between the standard lens and the telescope objective. In determining the shape magnification of an unknown lens, the space between the projected images of the separated lines of the target is measured with the target set so that the image is clear, that is, the position when a clear cut image is produced on the viewing screen, and without the lens to be tested on the lens supporting means of the instrument. When the parts are in this adjusted relation the light coming from the target and received by the telescope objective will be parallel, when testing magnification for distant objects.

The test lens is then placed in the lens supporting means with its ocular surface supported by the positioning device, the position of the target is adjusted to neutralize the focal power of the lens whereby a clear cut image of the separated lines is obtained, the space between the lines is again measured and by comparing the two measurements the shape magnification independently of magnification due to power is determined. The first measurement of the separation of the lines without a lens to be tested is obviously a function of the instrument alone so that the measurement with the lens in place gives directly the shape magnification when the graduations have their proper values.

The means for determining the relative changes in the sizes of the projected images forms one of the features of the present invention. The device comprises broadly a supporting box or frame which may be attached to the eye piece tube of a lens testing apparatus of conventional construction, such as broadly described above, the said supporting box or frame carrying a movable size measuring device for determining the size of the projected image as focused on the means carrying the measuring lines by the telescope objective, and magnified by the eye piece. The measuring device as a whole is readily adjustable relative to the optical axis of the instrument in order to properly position the device relative to the image should the test lens be slightly off center or have a prismatic correction. The details of the device will be discussed in the following description where its cooperation with the rest of the lens testing apparatus is described in detail.

Referring to Fig. I, an embodiment of the invention is illustrated in connection with an instrument of conventional form having a heavy base 1 which gives the whole instrument stability. A column or standard 2 extends upwardly from the base 1 and carries a very rigid arcuate shaped frame 3 pivotally secured to said standard at 4. The frame may be swung to any convenient angle relative to the standard 2 in order that the operator may conveniently operate the instrument. The frame 3 has at one end a table 5 on which a carriage 6 is slidably mounted and carries a source of illumination 7 and a target 8. Mounted intermediately of the frame 3 is a bracket 9 which carries a standard lens system 10, the optical axis of which is in accurate alignment with the center of the target 8.

The forward end of the frame 3 carries an image viewing portion or telescope 11 focused for parallel light entering the objective and is adapted to focus the projected image of the target 8 so that it will be visible to the operator in the plane of the plates 49 and 54 of size measuring means adjacent the eye piece 45. The target 8 is preferably formed with three evenly spaced parallel lines or cuts 61 and transverse lines or cuts 62 arranged at right angles to the parallel lines or cuts as shown in Fig. IX. The central intersection of the lines is made to lie on the optical axis of the instrument so that the image of the intersection will not be displaced relative to the viewing apparatus when the target is rotated with respect to the viewing apparatus.

The target 8 is mounted for rotational movement about its axis and is movable longitudinally of the optical axis of the instrument, through means of a tube 12 rotatably mounted in an apertured bracket 13 carried on the carriage 6 which carriage is longitudinally movable. The tube 12 has a telescoping tube 14, in which the target is mounted, the tube 14 being adjustable by a screw 16 to permit the alignment of the target 8 with the scale 18. The target is adapted to remain in adjusted relative position to the carriage and dials after the instrument is once assembled. The tube 12 carries a suitable dial 17, the outer edge of which has suitable angular graduations 18 adapted to cooperate with a marker 19 on the bracket 13 to indicate the angular position of the lines 61 and 62 on the target 8 when the target is rotated.

The carriage 6 has a rack 21 secured to its under side and is engaged by a pinion mechanism 22 which may be manipulated by means of a dial 23 carried on the shaft 24. The outer periphery of the dial has suitable graduations 26 for indicating the position of the carriage 6 and consequently the target 8. In calibrating the instrument, the dial 23 is manipulated to bring the image of the target 8 clearly in focus in the viewing portion 11, this being the zero or starting position. The dial 26 is preferably calibrated in diopters. When a lens A to be tested is placed on the edge of the nose 32, the dial may be adjusted until a clear cut image of the target is seen in the plane of the plates 49 and 54; the reading of the dial indicating the focal power of the lens is taken at the point of indication 25. The dial 26 is graduated in equal steps as is customary. The standard lens system 10 is composed of two or more units being shown in the drawings as two or more lenses 27 and 27A, sometimes held in separate cells so that they may be adjusted relative to each other, in order to vary the principal focus thereof and are adapted to remain fixed when the instrument is assembled. The purpose of this standard lens is to project the image of the target to a distance with respect to the lens under test, the image of the target passing through this standard lens and the lens to be tested to the image receiving portion of the instrument 11.

The lenses 27 and 27A are mounted in a tube 28 suitably secured in the upper end of the apertured bracket 9. A lens positioning nose 32 is threadedly engaged in the forward end of the tube 28. The lens and the nose 32 are relatively adjusted so that the forward lens supporting end of the tube will lie exactly in the plane of the principal focus of the standard lens system 10 when the lens supporting edge of the nose is in zero position.

In order to measure lenses which are to be worn at a different distance from the cornea than the test distance it is necessary for the tube 32 to be movable longitudinally in and out from its zero position or position wherein its lens supporting edge lies in the plane of the principal focus of the standard lens system 10, as shown in Fig. XIII. To designate this zero position and to determine the amount of in and out movement of the nose 32, suitable scale and indicator means 75 and 76 are used. The nose 32 is adapted to be screw threaded or otherwise adjustably connected with the support tube 28 so that it may be easily adjusted and held in said position. When the lens supporting edge of the nose 32 is exactly in the focal plane of the standard lens system 10, an infinitely thin power lens placed on this nose with the instrument adjusted so that a sharp image of the test target 8 is focused in the plane of the slide plates 49 and 54, will not change the apparent dimensions of the target as measured on said slide plates. This infinitely thin lens has no shape magnification but when a lens having substantial thickness, such as an ordinary deep curve lens having both shape magnification and focal power, is placed on the nose, and the focal power is compensated for by focusing the target 8 in the plane 78 of the slide plates 49 and 54, the apparent dimensions of the target will be changed by the shape magnification, and this shape magnification is measured by the lines 52 and 56 and micrometer means of the instrument. This gives the shape magnification independently of the power magnification of the lens. When the lens supporting edge of the nose 32 is moved a given amount from its zero position as indicated in Fig. XIII, or from its position at the principal focal plane of the standard lens system 10, the effective power magnification at the distance from the principal focal plane of the standard lens system equal to the movement of the lens supporting edge from its zero position is added to the shape magnification.

Suitable means such as a gooseneck bracket 33 having an aperture 34 through which the rays of the image may pass, is adapted to bear against the outer side of the lens A being tested to hold the said lens on the outer end 32 of the tube 28.

The lower end of the bracket 33 is slidable in a tubular guide 35 carried on the bracket 9 and is urged by means of a spring (not shown) toward the bracket 9. A suitable arm 36 adjustably carried on the frame 3 has a horizontal platform 37 which may be used to support eye glasses in the proper angular position when testing mounted lenses.

The image viewing portion 11 of the instrument carried by the forward end of the frame 3 comprises a tube 38 in which is mounted a telescope objective lens system 39 for the purpose of forming an image of the target upon the slide plates 49 and 54 of the size measuring means. The objective lens system 39 is comprised of a pair or more of lenses 39a and 39b, which are held in separate cells 41 and 42 respectively, relatively adjustable by means of screw threads so the focal length of the telescope objective may be adjusted to conform to the scale of the plates 49 and 54. This adjustment is made when the instrument is assembled and remains fixed thereafter. A disclosure of such an instrument will be found in Patent Numbers 1,281,717 to C. J. Troppman, 1,542,112 to E. D. Tillyer, and 1,556,550 to E. D. Tillyer.

As has been mentioned previously, one of the desired features of the invention is the provision of means for determining or comparing the size of images projected in the plane 78 of the slide plates.

To this end, a box-like support 44 (see Figs. I, III, IV and V) is provided which is adapted to be rotatably mounted adjacent the usual eye piece 45 of the standard instrument. This eye piece 45 has a lens system mounted for sliding adjustment relative to the support 44 to correct the focal error of each individual operator. A dovetailed slide 46 is slidably mounted in a dovetailed groove 47 in the support 44 and is moved in said dovetailed groove by means of an adjusting screw 48 extending through the support and screw threadedly engaging the slide 46. The slide 46 carries the slide plate or transparent member 49. This plate or transparent member has lines 51 and an opaque reference line 52 thereon (see Fig. VII). A second slide 53 which has a dovetailed slidable connection with the first slide 46, carries the slide plate or transparent member 54 on which is positioned an opaque reference line 56 (see Fig. VIII). The slide 53 is relatively adjustable with respect to the first slide 46 by means of a micrometer screw 57.

The amount of relative movement between the slides is determined by means of the scale 51 on the transparent member 49 and a micrometer scale and indicator means 59 associated with the screw 57. It will be readily apparent that the scale 51 may be omitted and a larger scale similar to the scale 59 may be associated with the screw 57 to determine the relative movement of the slides. It is to be understood that the scale may be calibrated in any desired units and may be direct reading, and is preferably calibrated in per cent shape magnification.

Box 44 rotates around the axis of the tube 38 so the lines 52 and 56 may be placed parallel with the lines 61 of the target 8.

In using the device for determining size magnification of a lens, the screw 48 may be turned to cause the reference line 52 on the member 49 to bisect the image of the line 61 on one side of the test target 8, as shown in Figs. VI and IX, and then the screw 57 is turned to cause the other reference line 56 on the member 54 to bisect the image of the line 61 of the test target 8 on the opposite side, the relative displacement of said reference lines being determined by the scales described above.

Assuming it is desired to measure only the shape magnification of a lens, the lens A to be tested is held with its ocular surface engaging the front end of the tube 32, which in this instance is located at the principal focus of the lens system 10, so that the said ocular surface will be supported in the plane of the principal focus of said lens system. It also is held in the meridional position it normally occupies in front of the eye of the wearer. The dial 23 and the protractor 18 are manipulated until the images of the spaced lines 61 of the target 8 are focused in the plane 78 of the plates 49 and 54 as indicated by the dot and dash lines 65 in Fig. II. It will be noted that the line 61 located as indicated at 73 to one side of the target 8, is adapted to be focused, as indicated at 74, in the plane 78 of the transparent members 49 and 54; and as indicated at 75, the line 61 located at the opposite side of the target 8 is adapted to be simultaneously focused in said plane, as indicated at 76. The distance between the focused images 74 and 76, as indicated by the arrow 77, indicates the size of image in that particular meridian and it is this distance which is measured by the means previously described for determining or comparing the size of images projected in the plane 78. If the lens A is spherical both lines 61 and 62 of the target 8 will be sharp. If they are cylindrical both of said lines will not be sharp at the same time. Taking the case of cylinders first: We rotate the target 8 until the apparent separation of the lines 61 is the greatest, indicating that they are located in one of the principal meridians of the lens. The dial 23 is then adjusted to move the target 8 to a position wherein the lines 61 will appear most clear and distinct. We then place the lines 52 and 56 parallel with the lines 61 of the target 8 and measure the separation of these lines. This gives the relative magnification in this meridian. We now rotate target 8 through 90 degrees, refocus by means of dial 23 so the lines 61 become sharp again and measure the size in this meridian with the lines 52 and 56. To obtain this adjustment the screw 48 is turned until the line 52 is over the image of the line 61, then the micrometer screw 57 is turned until line 56 is over the line 61 on the other side of the field. This gives the apparent space between the two lines 61 of the target and gives the size in this particular meridian.

The relative separation of these lines 61 is shown by the scales on the micrometer. If the micrometer is graduated in arbitrary units we measure the lines 61 without the lens A in place, then with it in place, and dividing the first measurement by the second, we obtain the shape magnification in that meridian, but it is preferred, to graduate the micrometer directly in terms of this division so that only the measure with the lens A in place must be made and the scale is direct reading in per cent of shape magnifications.

For a lens with no cylindrical power, the target is focused sharply so that both the lines 61 and 62 are sharp at the same time. With this type of lens there will be no difference in magnification in the two major meridians as in the case of a cylindrical lens. We set the micrometer to measure the apparent separation of the lines 61 as previously described, this gives the overall shape magnification of the lens. To definitely determine whether or not the lens is spherical we rotate the target 8 and note if any change takes place in the separation of the lines 61 during said rotation. If no change takes place we are sure that the lens is not cylindrical and that it has one overall shape magnification.

The method described above is for a lens under test for a distant object. To apply this method for the measurement of the size of image of a lens for a near object, a lens 69, Figs. I and XI, is inserted in the lens system of the measuring instrument. This lens is of such a negative power and is so positioned on the instrument that its virtual focal plane is at a distance from the lens rest 32 equivalent to the desired near object distance. In Fig. XI this virtual focal plane of the lens 69 is indicated at F. The reading or near object position is indicated at P, at 400 millimeters from the lens rest 32. F and P coincide. This distance of 400 millimeters, is an arbitrary reading distance. Any other position may be used. This lens 69 then renders rays of light 66 coming from a lens resting on 32, which would converge to point P, parallel, as indicated at 73, for the objective 39 to focus on the plane of the plates 49 and 54, as is the case for distant objects. The separation between the apparent lines 61 on the target 8 may be measured by the micrometer without the lens A under test and with the lens under test. The ratio taken and the shape magnification are determined just as for the distant object, and likewise the micrometer may be graduated for near objects without taking further measurements.

The lens 69 may be made as a cap attachment, shown in Fig. XII having holding means 72 adapted to be slipped over the end of the telescopic tube 38 for holding the lens in position.

The lens 69 has been shown as a bi-concave lens. This is merely for illustrative purposes, as it may be a well corrected lens and so designed that the same scale reading on the micrometer can be used for near and distant objects. This also gives the actual power of the lens in the reading position. For focusing, turn dial 23 in the usual manner, with the exception that another indicator must be placed on the dial for the near position, or two separate scales used.

In testing the patient for power, astigmatism and shape magnification, the power and astigmatism are given on the testing equipment as measured from the ocular surface of the lens, and separate from this there is given the size magnification, which must have added to it any shape magnification due to the spherical and cylindrical test lenses in order to obtain the complete shape magnification. The prescription for a lens system including size may be written in many ways. However, it is essential that it contain the spherical power, cylindrical power, axis of cylinder, the position of the equivalent thin lens (i. e. the ocular surface with respect to the eye), the overall shape magnification, the meridional shape magnification and the axis of this meridian. In addition it may contain prismatic data.

A great advantage of this invention is that by a simple and inexpensive attachment on a standard commercial optical measuring instrument and operated by the ordinary practitioner in the art, the results required can be obtained by direct reading without difficult and expensive calculations in the exact units and under the conditions in which the patient's eyes are measured, and this method of procedure represents the first time that the shape magnification has been measured in direct units, independently of the power of the lens.

By this procedure and apparatus I am not only able to obtain these results by a relatively inexpensive instrument, but I have at the same time provided means by which more accurate measurements can be obtained by direct and inexpensive methods of procedure.

Throughout I have discussed the measurement of one lens A. Obviously for any actual prescription work both lenses are measured as it is the ratio of the magnification of one eye to the other eye that is of importance and this ratio must be considered for a pair of lenses.

From the foregoing description it will be apparent that I have provided methods and means for obtaining all of the objects and advantages of the invention in simple, expedient and economical manner.

Having described my invention, I claim:

1. A device for measuring the shape magnification of a lens system comprising a test lens system, means in said test lens system for eliminating the effect of the focal power of the lens system under test with respect to a point of reference and means for measuring directly by scale means calibrated in per cent shape magnification in said test lens system the effect produced by the shape magnification of said lens system under test with respect to said reference point.

2. A device for measuring the shape magnification of a lens system comprising a test lens system, means in said test lens system for eliminating the effect of the focal power of the lens system under test with respect to the ocular surface of said lens system under test and means for measuring directly by scale means arranged to indicate per cent shape magnification in said test lens system the effect produced by the shape magnification of said lens system under test with respect to said ocular surface.

3. Means for obtaining the shape magnification of a lens system comprising means for producing an image, means for supporting the lens system to be tested with one of its lens surfaces located in the plane of the image formed by said image producing means whereby the effect of the focal power of the lens system under test is eliminated to produce an image unaffected by said focal power factor and means for measuring the shape magnification of the resultant image in terms of per cent shape magnification.

4. In combination with means for producing a test image for measuring the focal power of a lens system and means for eliminating the effect of the focal power magnification of said lens system on said test image and for allowing only the effect of the shape magnification to remain, means for measuring the test image as effected by said shape magnification comprising aligned slides having image receiving means, indicating means on each of said image receiving means, means to move the slides relative to each other to align the indicating means with separate given portions of the image to determine the size of the image and means to rotate the image receiving means about the axis of the image.

5. An attachment for an instrument for measuring the focal powers of lens systems by means of a projected image of test means comprising a pair of image receiving means having indicating means thereon, means for moving both of said image receiving means relative to each other and to the image whereby the indicating means on the respective image receiving means may be aligned with the extremities of the projected image and means for securing the said attachment to the instrument with the said image receiving means substantially aligned with the axis of the projected image of the instrument.

6. An attachment for an instrument for measuring the focal powers of lens systems by means of a projected image of test means comprising a pair of image receiving means having indicating means thereon, means for moving both of said image receiving means relative to each other and to the image whereby the indicating means on the respective image receiving means may be aligned with the extremities of the projected image, means for securing the said attachment to the instrument with the said image receiving means substantially aligned with the axis of the projected image of the instrument and means whereby the said image receiving means may be rotated about the axis of the image.

7. A device for measuring the shape magnification of lenses comprising a test target, a standard lens, means upon which an image of said target produced by said standard lens may be projected, means for holding a lens to be tested in the path of the projected image, means for eliminating the effect of the focal power of said lens on said image and means on said means upon which the image may be projected having portions separately adjustable relative to each other and to the image and alignable with given portions of the image for determining the change in size of the image on said means upon which it is projected as effected by the shape magnification of the lens being tested.

8. In an instrument embodying a projected image for testing lenses, means for determining the shape magnification of the lens for a known object distance comprising means for altering the vergence of the light rays utilized in projecting said test image to an amount substantially equal to the vergence of the light rays coming from an object at said known distance from the eyes and means upon which the image may be projected having portions separately adjustable relative to each other and to the image and alignable with given portions of the image for measuring the shape magnification of the resultant image.

9. In combination with means for producing a test image for measuring the focal power of a lens system and means for eliminating the effect of the focal power magnification of said lens system on said test image and for allowing only the effect of the shape magnification to remain, means for measuring the test image as effected by said shape magnification comprising aligned slides having means for receiving the test image, indicating means on each of said image receiving means, means to move the indicating means separately relative to each other and to the test image to align said indicating means with separate given portions of the image, and means for determining the spaced relation of said indicating means when in aligned relation with said separate given portions of the image to determine the size of said image.

10. A device for measuring the shape magnification of a lens system comprising a test lens system, means in said test lens system for eliminating the effect of the focal power of the lens system under test with respect to a point of reference, and means for measuring directly by means calibrated in terms of shape magnification in said test lens system, the effect produced by the shape magnification of said lens system under test with respect to said reference point.

11. In an instrument embodying a projected image for testing lenses, means for determining the magnification of the lens for a known object distance comprising means for altering the vergence of the light rays utilized in projecting said test image to an amount substantially equal to the vergence of the light rays coming from an object at said known distance from the eyes, and means for receiving the projected image having portions adjustable relative to each other and to the image and alignable with given portions of the image for measuring the magnification of the resultant image.

EDGAR D. TILLYER.